(12) United States Patent
Trautmann et al.

(10) Patent No.: US 10,771,384 B2
(45) Date of Patent: Sep. 8, 2020

(54) ROUTING BASED BLOCKCHAIN

(71) Applicants: Tyson Trautmann, Redondo Beach, CA (US); Andrew Burnell, Redondo Beach, CA (US)

(72) Inventors: Tyson Trautmann, Redondo Beach, CA (US); Andrew Burnell, Redondo Beach, CA (US)

( * ) Notice: Subject to any disclaimer, the term of this patent is extended or adjusted under 35 U.S.C. 154(b) by 203 days.

(21) Appl. No.: 16/104,849

(22) Filed: Aug. 17, 2018

(65) Prior Publication Data

US 2020/0059430 A1    Feb. 20, 2020

(51) Int. Cl.
| | |
|---|---|
| *H04L 12/721* | (2013.01) |
| *G06Q 20/06* | (2012.01) |
| *H04L 29/06* | (2006.01) |
| *H04L 12/26* | (2006.01) |

(52) U.S. Cl.
CPC .......... *H04L 45/70* (2013.01); *G06Q 20/065* (2013.01); *H04L 43/16* (2013.01); *H04L 69/22* (2013.01); *G06Q 2220/00* (2013.01)

(58) Field of Classification Search
CPC ... H04L 2209/38; H04L 45/20; H04L 9/0637; H04L 9/3236; H04L 61/2015; H04L 45/70; H04L 9/0825; G06Q 50/06
See application file for complete search history.

(56) References Cited

U.S. PATENT DOCUMENTS

| | | | | |
|---|---|---|---|---|
| 10,200,834 | B2* | 2/2019 | Tran | A63F 11/00 |
| 10,616,324 | B1* | 4/2020 | Kaddoura | H04L 43/04 |
| 2008/0298360 | A1* | 12/2008 | Wijnands | H04L 12/18 |
| | | | | 370/389 |
| 2016/0294783 | A1* | 10/2016 | Piqueras Jover | H04L 63/0442 |
| 2016/0321654 | A1* | 11/2016 | Lesavich | G06F 21/6245 |
| 2017/0031676 | A1* | 2/2017 | Cecchetti | H04L 9/0891 |
| 2017/0048209 | A1* | 2/2017 | Lohe | H04L 63/0442 |
| 2017/0078189 | A1* | 3/2017 | Han | H04L 45/20 |
| 2017/0103468 | A1* | 4/2017 | Orsini | G06Q 40/12 |
| 2017/0111385 | A1* | 4/2017 | Madhu | G06Q 50/01 |
| 2017/0358041 | A1* | 12/2017 | Forbes, Jr. | G06Q 20/102 |
| 2018/0293363 | A1* | 10/2018 | Asati | G06F 21/10 |
| 2018/0299852 | A1* | 10/2018 | Orsini | G06Q 50/06 |
| 2019/0081793 | A1* | 3/2019 | Martino | H04L 9/0894 |
| 2019/0114584 | A1* | 4/2019 | Toohey | H04W 4/35 |
| 2019/0289068 | A1* | 9/2019 | Ma | H04L 45/00 |
| 2019/0295102 | A1* | 9/2019 | Hines | G06F 21/6254 |
| 2019/0318348 | A1* | 10/2019 | Brenner | G06Q 50/184 |
| 2019/0318816 | A1* | 10/2019 | Witchey | G16H 10/60 |
| 2019/0340269 | A1* | 11/2019 | Biernat | G05B 19/4093 |
| 2019/0394023 | A1* | 12/2019 | Menon | H04L 9/3228 |
| 2020/0014527 | A1* | 1/2020 | Subramaniam | H04L 9/0825 |
| 2020/0076610 | A1* | 3/2020 | Wang | H04L 9/0637 |
| 2020/0084097 | A1* | 3/2020 | Marks | H04L 61/2015 |

\* cited by examiner

*Primary Examiner* — Sargon N Nano
(74) *Attorney, Agent, or Firm* — Schwegman Lundberg & Woessner, P.A.

(57) ABSTRACT

Disclosed are various embodiments for implementing a blockchain utilizing routed packets to generate blocks. A given packet can be signed and analyzed to determine whether the signed packet satisfies root packet criteria. Packets that satisfy root packet criteria can be analyzed to determine whether they collectively satisfy a predetermined block criteria. A block can be added to the blockchain when the block criteria is met.

20 Claims, 13 Drawing Sheets

ROUTING BASED BLOCKCHAIN

TECHNICAL FIELD

The present disclosure generally relates to machines configured to the technical field of special-purpose machines that perform routing based blockchain and improvements to such variants, and to the technologies by which such special-purpose machines become improved compared to other special-purpose machines for a blockchain network using packet routing.

BACKGROUND

In blockchain networks, and other similar technologies, it may be desirable to implement a network scheme that allows a network of untrusted nodes to maintain a shared and trusted state in such a way that makes it difficult for any one actor to hijack control of that state. For example, Bitcoin's Proof-of-Work (PoW) scheme accomplishes this by giving each node in the network an amount of control that is proportional to the processing power that the node contributes to the network. While effective, this approach has several drawbacks, including the fact that the hardware and electricity used for PoW based mining is wasted. Further, PoW based systems are vulnerable to a "51% attack" in which a bad actor that has gained control at least 51% of the processing power in the network uses that control to conduct fraudulent activities, such as double spending. The estimated cost of the hardware and electricity necessary to conduct a 51% attack on large blockchain networks is within the reach of network entities, such as mining pools and governments.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
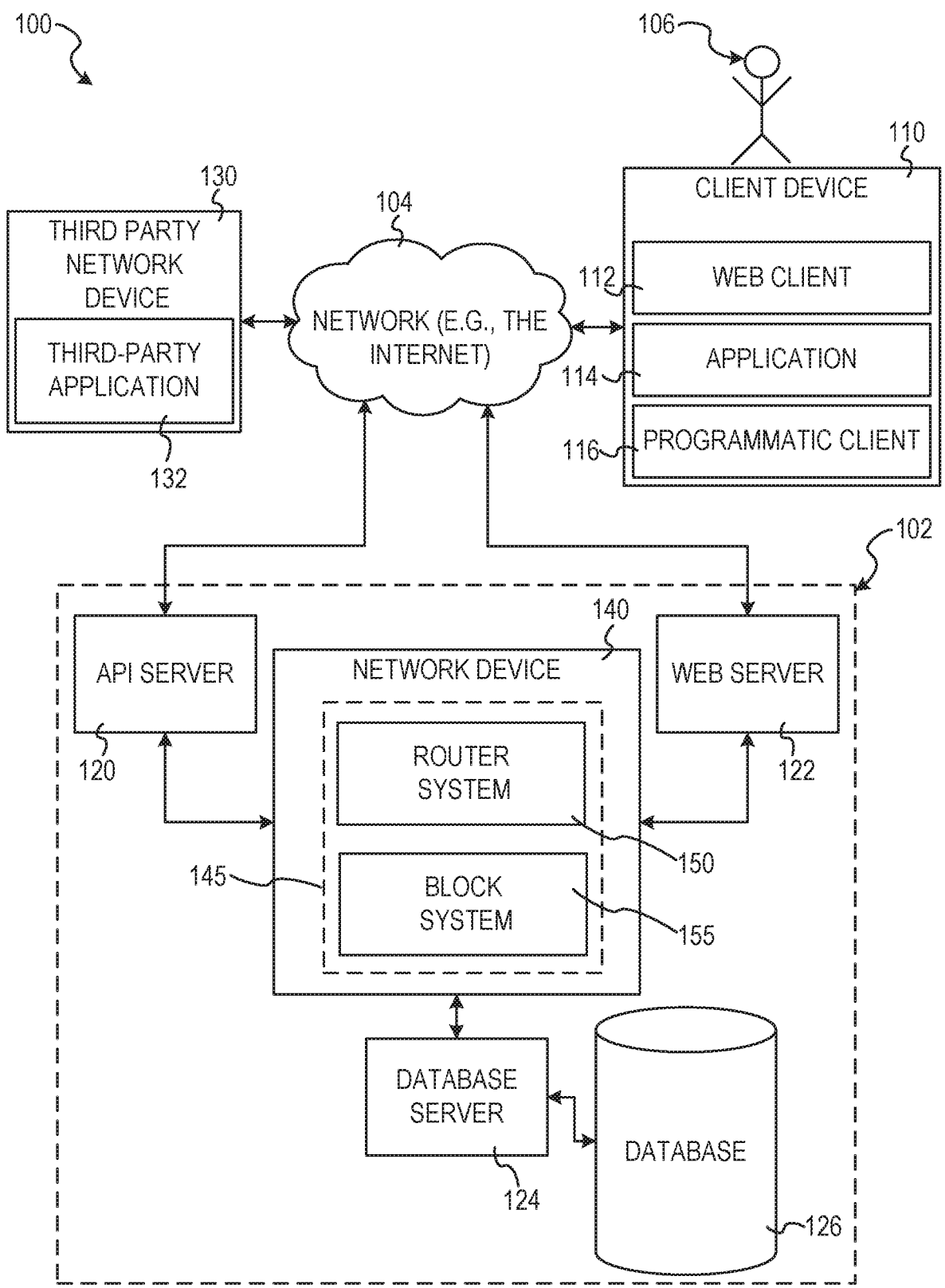
FIG. 1 is a block diagram illustrating a networked system, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As mentioned, some blockchain networks cause wasted computational resources and are vulnerable to network-based attacks, such as the 51% attack. To this end, a blockchain based router system can implement a proof-of-routing scheme that can securely implement a blockchain network without wasting resources. In some example embodiments, the blockchain based router system includes different nodes that process packets between endpoints (e.g., client devices). Nodes can include router nodes which perform the function of analyzing and routing packets, and block nodes which manage collections of specially labeled packets and generation of new blocks in a blockchain.

In some example embodiments, when router nodes in the blockchain based router system receive a packet, the router signs the packet using a signature aggregation scheme. The signature is added to the packet (e.g., packet header, packet footer, metadata associated with the packet). The router node then evaluates the packet to determine whether it is a root packet. Root packets are packets that satisfy a predetermined root packet criteria. The root packet criteria specifies individual parameters or thresholds that each packet must meet to be considered a root packet (e.g., primary packet, colored packet, valid packet). For example, the router node may determine that a given packet is a root packet by determining that a value of the root packet (e.g., the signature, hash of the signature) starts with a pre-specified number of zeros (e.g., five zeros). The root packet criteria statistically ensures that only a small amount of the packets in a given network are root packets (e.g., given an input of routers, and traffic, the root packet criteria to adjust the probability of a packet being identified as a root packet). In some example embodiments, all packets received by a router node are rapidly signed and forwarded to their respective destinations to ensure that the router nodes do not slowdown the network. If a root packet is identified, a copy of that packet is forwarded to a block node, according to some example embodiments.

A block node can collect root packets from one or more router nodes. A block node discovers a valid block (e.g., the next block to be added to the blockchain) by determining that the root packets collected at that node satisfy a predetermined block criteria. The block criteria specifies one or more group parameters that the root packets must collectively satisfy in order to be considered a valid block. For example, the block criteria can specify that at least 1000 root packets must be collected, and that those 1000 root packets must each be have been signed and routed by 100 unique routers. For example, a first packet of the 1000 packets may have been signed and routed by 100 different unique routers (i.e., different and unique to the first packet). Further, a second packet of the 1000 packets may have also been signed and routed by 100 different and unique routers (i.e., different and unique to the second packet). In some example embodiments, the set of routers used to route the first and second packets may overlap to some extent (e.g., the first and second packets were both signed and routed by at least one router of the 100). In some example embodiments, the block criteria can further specify that each packet must be routed by 100 unique routers, where each of the 100 routers is not used to router other packets in the 1000. Upon the root packets at a given block node satisfying the block criteria, the block node then generates a new block in a blockchain. The new block stores the collected root packets and further records other parameters, such as transactions, to the shared state in the blockchain.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a browser), application 114, and a programmatic client 116 executing on the client device 110. Although FIG. 1 shows one client device 110, in other implementations, the network architecture 100 comprises multiple client devices 110.

In various implementations, the client device 110 comprises a computing device that includes at least a display and communication capabilities that provide access to the networked system 102 via the network 104. The client device 110 comprises, but is not limited to, a remote device, workstation, computer, general purpose computer, Internet appliance, hand-held device, wireless device, portable device, wearable computer, cellular or mobile phone, personal digital assistant (PDA), smartphone, tablet, ultra-book, netbook, laptop, desktop, multi-processor system, microprocessor-based or programmable consumer electronic, game consoles, set-top box, network personal computer (PC), mini-computer, and so forth.

The client device 110 communicates with the network 104 via a wired or wireless connection. For example, one or more portions of the network 104 comprises an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, blockchain wallet apps to send or receive blockchain based transactions, media apps (operable to present various media forms including audio and video), messaging apps, electronic mail (email) apps.

The web client 112 accesses the various systems of the networked system 102 via the web interface supported by a web server 122. Similarly, the programmatic client 116 and the application 114 accesses the various services and functions provided by the networked system 102 via the programmatic interface provided by an application program interface (API) server 120.

Users (e.g., the user 106) comprise a person, a machine, or other means of interacting with the client device 110. In some example embodiments, the user 106 is not part of the network architecture 100, but interacts with the network architecture 100 via the client device 110 or another means. For instance, the user 106 provides input (e.g., touch screen input or alphanumeric input) to the client device 110 and the input is communicated to the networked system 102 via the network 104. In this instance, the networked system 102, in response to receiving the input from the user 106, communicates information to the client device 110 via the network 104 to be presented to the user 106. In this way, the user 106 can interact with the networked system 102 using the client device 110.

The API server 120 and the web server 122 are coupled to, and provide programmatic and web interfaces respectively to, an network device 140 (e.g., server, peer node). The network device 140 can host a blockchain based router system 145. The blockchain based router system 145 further comprises a router system 150 (e.g., router node) and block system 155 (e.g., block node). Although in the example illustrated in FIG. 1 the router system 150 and block system 155 are hosted on the network device 140, in some example embodiments the router system 150 is hosted on a different device than the device that hosts the block system. For example, the router system 150 can be executed from the third-party network device 130 and connect to the block system 155 on the network device 140 via a network, such as network 104.

The network device 140 is shown to be coupled to a database server 124 that facilitates access to one or more information storage repositories, such as database 126. In an example embodiment, the database 126 comprises one or more storage devices that store information (e.g., blockchain data) to be accessed by the network device 140 or client device 110. Additionally, a third-party application 132, executing on third party server 130, is shown as having programmatic access to the networked system 102 via the programmatic interface provided by the API server 120. For example, the third-party application 132, utilizing information transmitted to or retrieved from the networked system 102.

Further, while the client-server-based network architecture 100 shown in FIG. 1 employs a client-server architecture, the present inventive subject matter is, of course, not limited to such an architecture, and can equally well find application in a distributed, or peer-to-peer (e.g., node based miner network), architecture system, for example. The various systems of the applications server 140 can also be implemented as standalone software programs, which do not necessarily have networking capabilities.

Figure 2:
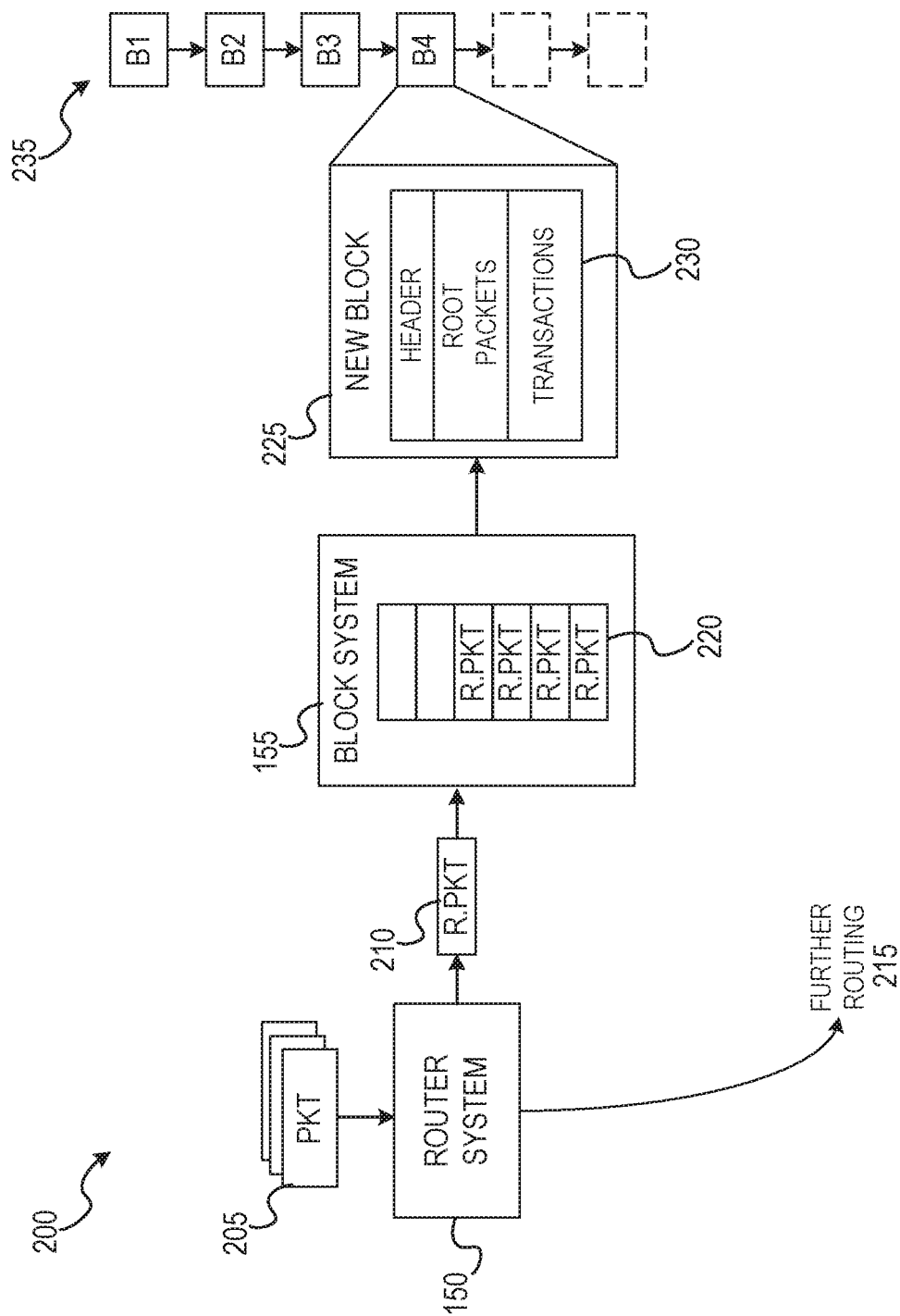
FIG. 2 illustrates an example network architecture implementing a blockchain based router system, according to some example embodiments.

FIG. 2 illustrates an example network architecture 204 implementing a blockchain based router system, according to some example embodiments. As discussed above, router nodes and block nodes can be hosted on or otherwise executed from the same computational device or different network computational devices. In the example of FIG. 2, the router node is displayed as router system 150 and the block node is displayed is a block system 155. The router system 150 manages receiving a plurality of packets 205 from other network devices, such as other routers. The router system 150 is configured to sign each of the received packets using a signature scheme, such as the Boneh-Lynn-Shacham (BLS) signature scheme. The router system 150 then analyzes the received signed packets determine whether any of the signed packets are valid packets that satisfy a root packet criteria. The root packet criteria can comprise one or more computational tests or puzzles that statistically ensure that a small number of packets in a given network qualify as root packets. For example, root packet criteria may specify that the BLS signature of a given packet must have a specified quantity of leading zeros (e.g., a match value that is specified as a prefix of five zeros, a suffix of two zeros, etc.) to qualify as a root packet. As an additional example, another root packet criteria may specify that to be a root packet the sum of the BLS signature of a given packet and a nonce must add up to less than a preset limit, e.g., less than 100. Additional parameters that can be included in root packet criteria, include: the first, second, and third digits of a packet value (e.g., the signature) must equal the fourth digit of the packet value, the digits of the packet value must all be even numbers, the digits of the packet value must all be greater than a number (e.g., greater than 7), the last two digits of the packet value must match the current data.

The parameter or values used to satisfy the root packet criteria can be configured to be innate part or derived from an innate part of the packet itself (e.g., its signature, its hash). In this way, packets can be identified as root packets in a way that does not require brute force computational guessing. Instead, a given packet either meets the root packet criteria or does not, thus saving computational resources by avoiding brute force work methods (e.g., PoW).

As illustrated, when the router system 150 identifies a root packet the router system 150 transmits the root packet 210 to the block system 155 for collection and analysis. Further, according to some example embodiments, all packets received by the router system 150 are quickly signed and validated and are then transmitted for further routing 215 so as to not slow down the network.

The block system 155 collects a plurality of root packets 220 and analyzes the collection of root packets 220 to determine whether they satisfy a block criteria. The block criteria specifies one or more requirements that the collection of root packets 220 must collectively satisfy in order for a new block 225 of a blockchain 235 to be generated by the block system 155. For example, the block criteria may specify that to discover a valid block, the block system 155 must have collected a specified number of root packets, and further require that each of the collected root packets have additional attributes, such as having been handled by a certain number of routers (e.g., 100) that have validly signed the packet. Additional parameters that can be included as criteria according to different network configurations, include: a requirements that the packets of a block to be generated by signed and routed by at least some quantity (e.g., 50) routers that did not route packets included in the last block, a requirement that a percentage (e.g., 10%) of the packets in the block to be generated have been signed and routed by at least some quantity (e.g., 10) routers, a requirement that no single router routed and signed more than some percentage of the packets in the block (e.g., no router signed/routed more than 50% of the packets in the block to be generated).

Assuming collection of root packets 220 satisfies a block criteria, the block system 155 generates the new block 225 which includes block data 230. The block data 230 can include header data, each of the root packets, and additional transactional data. The new block 225 is then recorded to the shared state of the blockchain 235, for example as a fourth block "B4". Other block nodes (not depicted) that are network connected to block system 155 can independently validate that the collection of root packets 220 satisfy the block criteria because the root packets are recorded in the block data 230 for analysis.

In some example embodiments, if a block node successfully discovers a group of root packets that allows a block node to generate the next block in the blockchain, that block node and any routers that contributed to that group of root packets are issued cryptographic units (e.g., cryptocurrency coins or tokens, or fractional portions thereof). The cryptocurrency units may be recorded as transactions in the blockchain 235. In some example embodiments, the router system 150 does not know the block criteria and the block criteria is only accessible to block nodes, such as block system 155.

In some example embodiments, routers that are downstream or upstream from a root packet at a given router are also issued cryptographic units for handling the packets. That is for example, assume a first router receives a packet, signs the packet using BLS signature and determines that the packet is not a root packet (e.g., does not meet the root packet criteria). The first router then forwards the packet to a second router along the packet path. The second router then signs the packet using BLS and determines that the second router's signature of the packet does in fact meet root packet criteria, thus the packet is sent to a block node and eventually included in a new block in a blockchain. Upon that packet being included in the new block, all entities that processed the packet receive cryptographic units. That is, the block node, the first router, and the second router node all receive cryptographic units for using computational resources to process the packet. Thus, while a given router may determine that a packet is currently not a root packet based on the signature at that router, the given packet may later become a root packet when signed by another router in the packet's network path. Further, in some example embodiments, even if a given packet was previously deemed to be a root packet upstream (on a previous router), the given packet may still later be found to be a root packet down the stream (on a later router). Thus, it is in each routers interest to rapidly forward all packets, because each packet may eventually be found to be a root packet and subsequently recorded in a block.

Although specific values for root packet criteria and block criteria are discussed here as examples, it is appreciated that the exact value can be varied to increase or decrease the difficulty of meeting the thresholds in response to changing network conditions. For example, the quantity of prefix zeros required in a given root packet criteria can be increased from two to 10 to increase the difficulty in finding valid root packets. Further, the number of packets, age of root packets, number of routers touched by each root packet can be increased or decreased to vary the difficulty in satisfying the block criteria. In some example embodiments, the root criteria and/or block criteria are dynamically adjusted in response to network conditions. For example, if blocks in the blockchain are being generated faster than a preset rate (e.g., every 5 minutes, every 10 minutes, once a day), then the root and block criteria may be modified to increase the difficulty. As another example, if root packets are being collected at greater than a preset limit, the root packet criteria can be modified dynamically to decrease the amount of root packets identified. In some example embodiments, the root criteria and block criteria are manually adjusted (e.g., by an administrator) to compensate for the varying network conditions (e.g., different amounts of routers, varying speeds of block generation or root packet collection, and so on).

Figure 3:
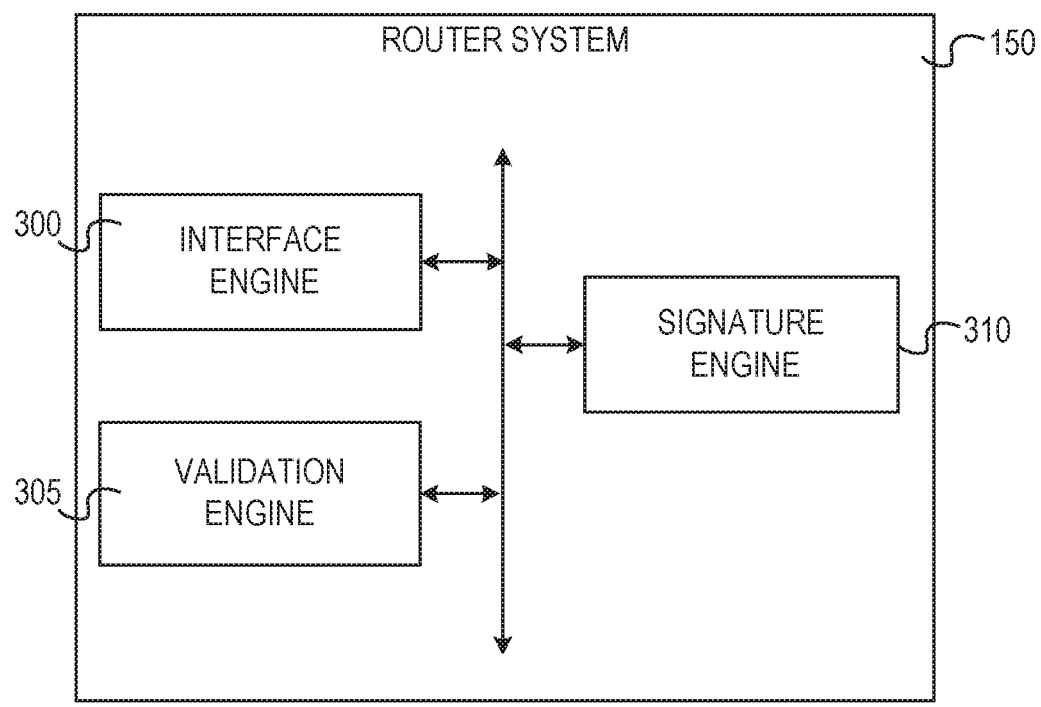
FIG. 3 illustrates example functional engines of a router system, according to some example embodiments.

FIG. 3 illustrates example functional engines of a router system 150, according to some example embodiments. As illustrated, the router system 150 comprises an interface engine 300, a validation engine 305, and the signature engine 310. The interface engine 300 is configured to perform routing functions for the router system 150, such as receiving and transmitting packets. The signature engine 310 is configured to sign a received packet using a signature scheme. In some example embodiments, signature engine 310 is configured to implement a size-stable aggregate signature scheme (e.g., BLS signature scheme) to sign a given packet in such a way that the packet overhead is not increased. Further, in some example embodiments, the signature engine 310 implements a signature scheme that increases the size of the packet as more routers sign the packet (e.g., each signature is added to a header or footer of the packet).

The validation engine 305 is configured to analyze a signed packet to determine whether the signed packet is a root packet. For example, the validation engine 305 can determine that a given packet is a root packet based on that packet satisfying root packet criteria.

Figure 4:
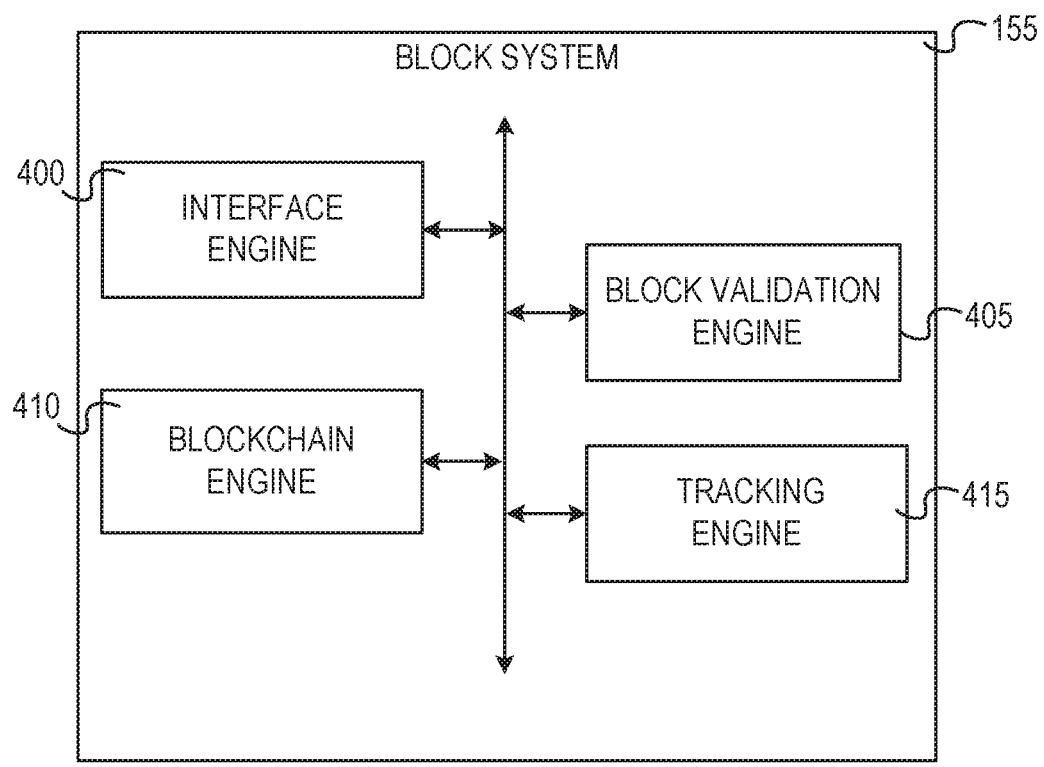
FIG. 4 shows example functional engines of a block system, according to some example embodiments.

FIG. 4 shows example functional engines of a block system 155, according to some example embodiments. As illustrated, the block system 155 comprises an interface engine 400, a block validation engine 405, the blockchain engine 410, and the tracking engine 415. The interface engine 400 is configured to receive root packets from one or more router nodes, such as router system 150. For example, the block system 155 may be co-located in an Internet exchange point (IXP), which houses a plurality of interconnected routers (e.g., routers from different Internet service providers (ISPs)). Each of the plurality of routers may include a router node, such as router system 150. As the router nodes identify root packets, they forward the identified root packets to the interface engine 400 of the co-located block system 155.

The block validation engine 405 is configured to analyze the received root packets and determine whether the root packets collectively satisfy block criteria, according to some example embodiments. In some example embodiments, the block validation engine 405 is configured to interface with other block validation engines of other block systems to operate as a mining pool that aggregates root packets. In those example embodiments, if the root packets shared between the networked block validation engines satisfies a block criteria, any of the block systems can generate the next block and all block systems in the pool receive cryptocurrency units in compensation for mining the block.

The blockchain engine 410 manages collecting root packets, determining whether the collected root packets satisfy a block criteria, and generating a new block for storage in the blockchain, according to some example embodiments."

The tracking engine 415 is configured to perform one or more transactions. For example, the tracking engine 415 can be configured to analyze which network components (e.g., router nodes, block nodes) processed root packets that are included in a given block and issue cryptocurrency units to those network components. In some example embodiments, the tracking engine 415 is configured to interface with smart contracts stored on the blockchain to change the state or otherwise update the smart contract on the blockchain as part of a shared state. In some example embodiments, the smart contracts can be configured to track usage of network links (e.g., peering between router nodes) can be recorded on the blockchain. For instance, a given smart contract can trigger payments of units (e.g., cryptocurrency units, fiat currency units) based on the existence of the network links. In particular for example, network link usage can be determined from the root packets that are written to the blockchain and a given smart contract can automatically trigger an exchange of payments based on the usage. Further, in some example embodiments, the smart contracts can be configured to track purchases or leases of other network resources (e.g., IP addresses, DNS records). The purchase/lease events can be recorded to the shared state in the blockchain and a given smart contract can initiate payment of units at specified times (e.g., lease payment, end of specified lease term). According to some example embodiments, smart contracts are account holding data objects managed on the blockchain. The contracts can contain executable code that can interact with user wallets, memory values stored on the blockchain, or other smart contracts. Interaction with the smart contracts may incur cryptocurrency costs or tokens of the blockchain. In some example embodiments, the block node that generates the new block uses the tracking engine 415 to interact with any smart contracts included as transactions in the block.

Figure 5:
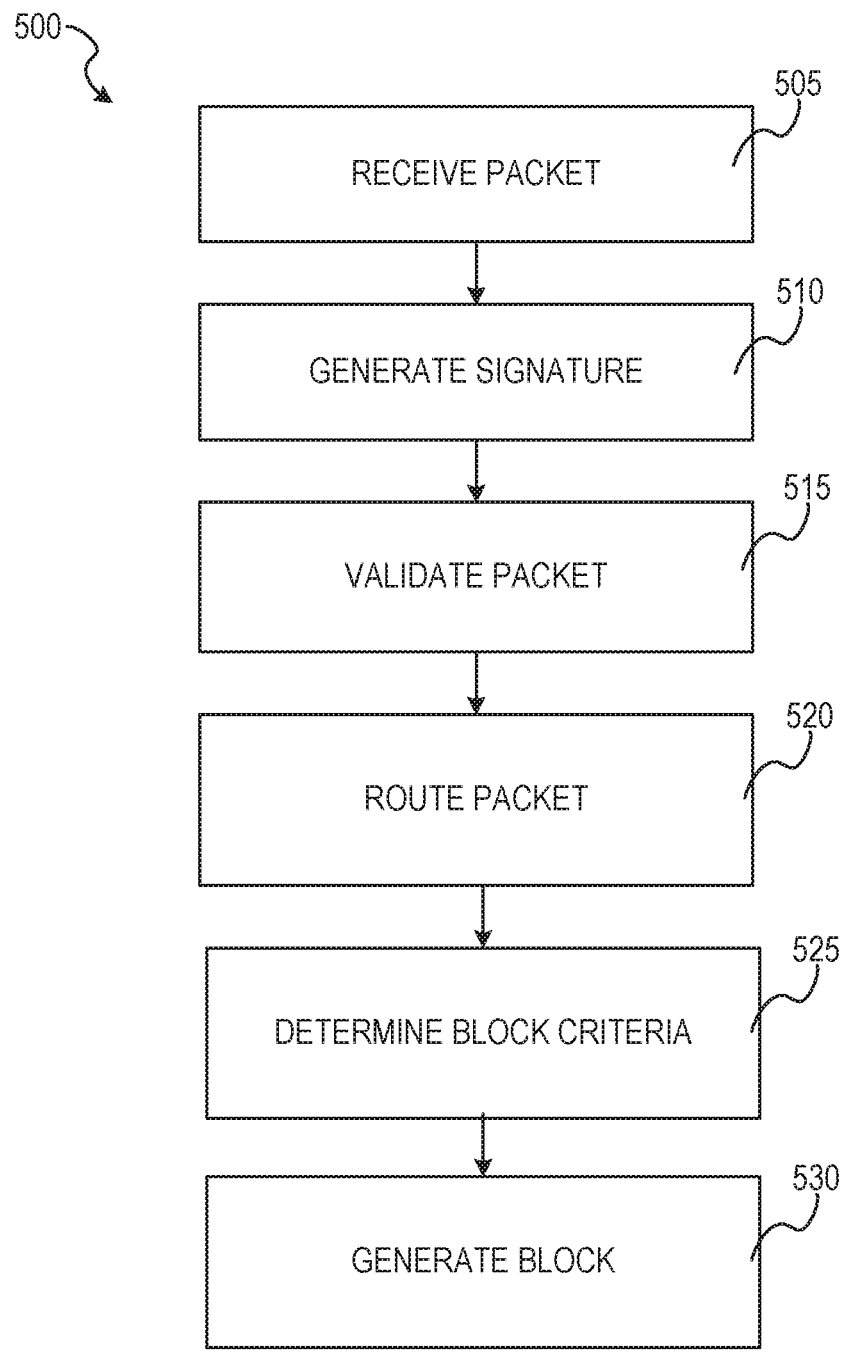
FIG. 5 shows an example flow diagram of a method for implementing router based blockchain, according to some example embodiments.

FIG. 5 shows an example flow diagram of a method 500 for implementing router based blockchain, according to some example embodiments. At operation 505, the interface engine 300 of a router system 150 receives a network packet. At operation 510, the signature engine 310 of the router system 150 generates a signature of the packet by signing the packet. In some example embodiments, at operation 510, the signature engine 310 signed the packet using an aggregate signature scheme, such as the BLS signature scheme. At operation 515, the validation engine 305 of the router system 150 validates the signed packet to determine whether the signed packet is a root packet. In some example embodiments, a signed packet is a root packet if a numerical value of that packet (e.g., the packet signature, a hash of a portion of the packet, a hash of the packet signature) satisfies packet root criteria as discussed above.

At operation 520, the interface engine 300 routes the packet to one or more network destinations. In some example embodiments, at operation 520, the interface engine 300 routes a non-root packet to additional network devices, such as further routers along a given packet's path. As discussed, a non-root packet is a packet that is determined to be not a root at that router, but may be deemed a root packet at another router depending on the signature generated by the other router. Further, in some example embodiments, at operation 520, the interface engine 300 routes root packets to one or more miner nodes, such as block system 155.

At operation 525, the block validation engine 405 of the block system 155 determines whether the received root packets collectively satisfy a block criteria. For example, at operation 525, the block validation engine 405 determines that a quantity of root packet has been received wherein each of the root packets has been processed or routed by a prespecified number of routers between endpoints of the packet's path. At operation 530, the blockchain engine 410 generates a new block in response to the received root packets collectively satisfying the block criteria.

Figure 6:
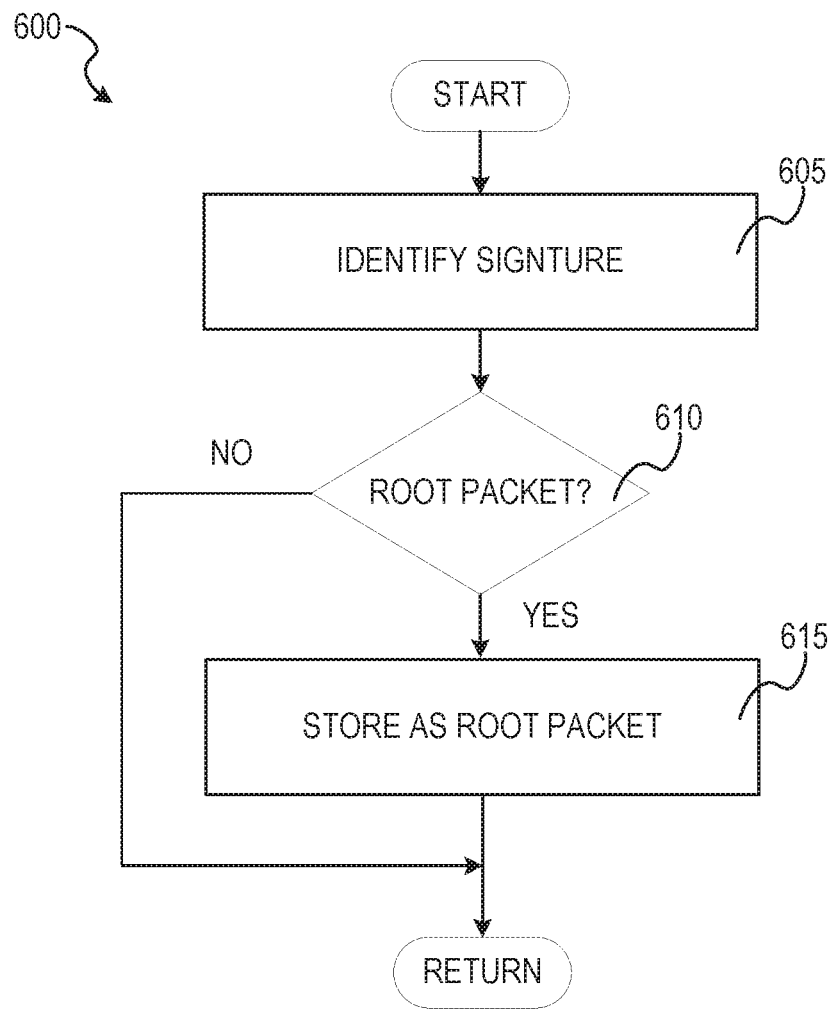
FIG. 6 shows a flow diagram of an example method for processing packets in a router based blockchain, according to some example embodiments.

FIG. 6 shows a flow diagram of an example method 600 for processing packets in a router based blockchain, according to some example embodiments. The operations of the method 600 can be implemented as a subroutine of operation 515 in which signed packets are validated as being root packets. At operation 605, the validation engine 305 identifies signature of a signed root packet. At operation 610, the validation engine 305 determines whether the packet is a root packet by determining whether a value of the packet satisfies predetermined root packet criteria. For example, the validation engine 305 determines whether the signature of the packet satisfies the root packet criteria. In some example embodiments, the root packet criteria specifies that the packet matches a non-cryptographic based attribute to be considered a root packet. For example, a percentage of packets in a given network may be pre-tagged, labeled, or otherwise have metadata associated with them that identify the packets as root packets. In those example embodiments, operation 605 may be skipped since it is not used to evaluate packets against a root packet criteria. Furthermore, in those example embodiments, at operation 610, the validation engine 305 determines that a given packet is a root packet based upon the packet having a value (e.g., tag, label, metadata item, header data, payload data) that identifies it as a root packet.

At operation 615, in response to determining that the signature of the signed packet satisfies the root packet criteria the packet is stored as a root packet. On the other hand, if at operation 610, the validation engine 305 determines that the signature of the packet does not satisfy the root packet criteria the method skips operation 615 and the packet is not stored as a root packet.

Figure 7:
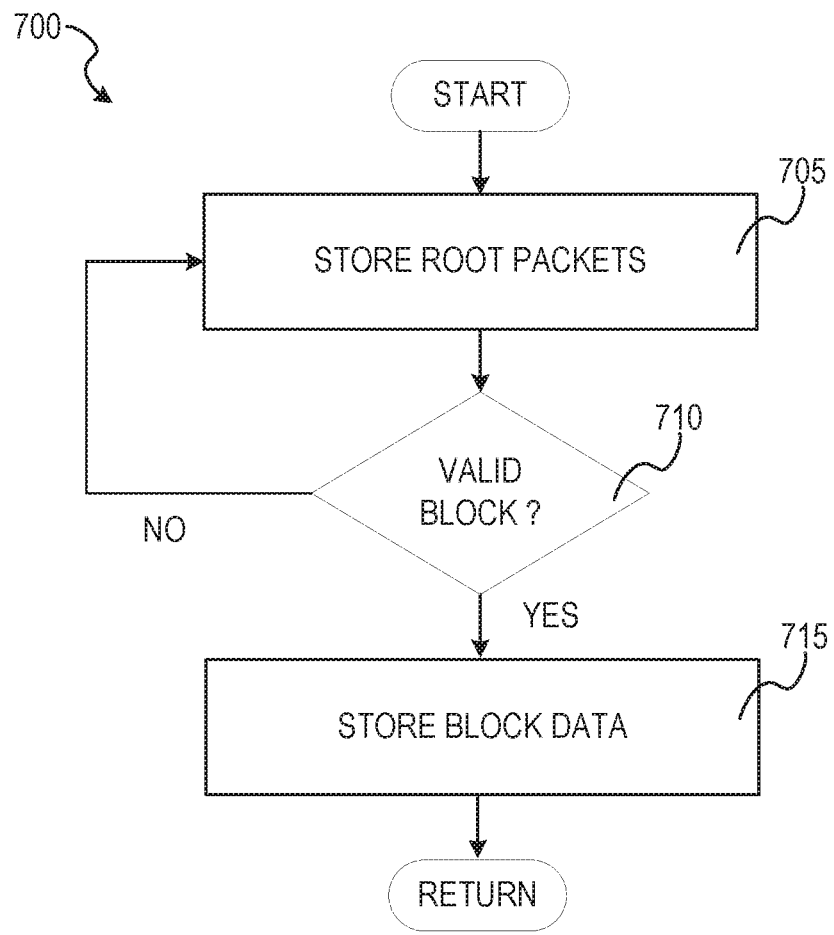
FIG. 7 shows a flow diagram of an example method for processing block data in a router based blockchain, according to some example embodiments.

FIG. 7 shows a flow diagram of an example method 600 for processing block data in a router based blockchain, according to some example embodiments. The operations of the method 700 can be implemented as a subroutine of operation 525 in which it is determined whether the received root packets satisfy the block criteria. At operation 705, the interface engine 400 of the block system 155 stores the root packets received from one or more router nodes, such as router system 150. At operation 710, the block validation engine 405 determines whether the received root packets collectively satisfy the block criteria. If the received root packets to not satisfy the block criteria, the method 700 returns to operation 705 in which additional root packets are stored. In some example embodiments, operation 710 is initiated in response to receiving each new root packet. Further, in some example embodiments, operation 710 is performed periodically (e.g., hourly, daily) to determine whether the root packets collected during the last period satisfy the block criteria.

Returning to operation 710, if the block validation engine 405 determines that the collected root packet satisfy the block criteria, the method 700 continues to operation 715, where the block validation engine 405 stores block data for use by the blockchain engine 410. The block data stored at operation 715 may include some or all of the root packets that satisfy the block criteria. Additionally, in some example embodiments, the block data stored at operation 715 includes one or more transactions, such as transactions that issue cryptocurrency units to those computational units that handled root packets included in the new block.

When a group of received root packets collectively satisfy a block criteria a new block is generated which stores the received root packets. The router based blockchain can then be analyzed to determine which network components are responsible routing different portions of the network traffic. In some example embodiments, units of cryptocurrency or fiat payments are then transferred to an account of the network components in proportion to the amount of traffic each routed.

Figure 8:
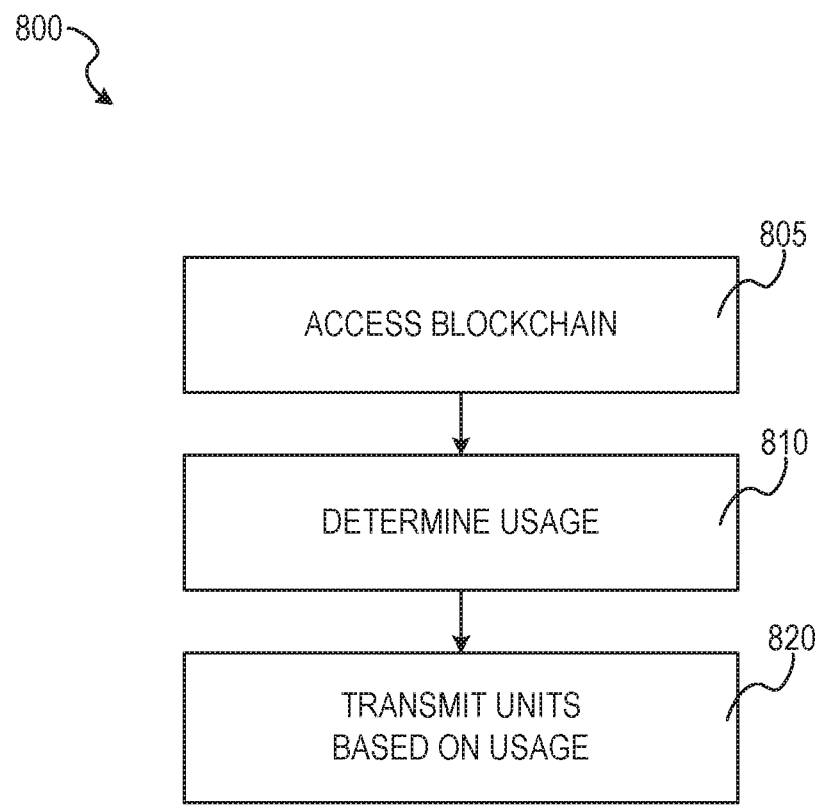
FIG. 8 shows a flow diagram of a method for transmitting units of cryptocurrency based on usage of the router based blockchain network, according to some example embodiments.

FIG. 8 shows a flow diagram of a method 800 for transmitting units of cryptocurrency based on usage of the router based blockchain network, according to some example embodiments. At operation 805, the tracking engine 415 accesses the blockchain. For example, at operation 805, the tracking engine 415 accesses a router based blockchain in which each block of the blockchain stores root packets. At operation 810, the tracking engine 415 determines network usage from the root packets stored in the blockchain. For example, at operation 810, the tracking engine 415 can determine that a first set of routers is responsible for routing 90% of the root packets in a network, and a second set of routers is responsible for routing 10% of the network traffic. At operation 815, the tracking engine 415 transmits units of cryptocurrency or fiat currency to accounts of the network components based on their participation in routing traffic of the network. For example, the first set of routers may receive nine units of the cryptocurrency tracked using the blockchain, and the second set of routers may receive one unit of cryptocurrency that is tracked via the blockchain.

In some example embodiments, the distributions and network credits to be issued can be specified in smart contracts managed on the blockchain. That is, executable instructions within the smart contracts can be automatically interacted with by block nodes to cause issuance of the units of network credits (e.g., cryptocurrency proportions) or change the state of a given smart contract to record a new value. Further, as discussed, in addition to root packets, other types of data can be recorded and managed by the blockchain, e.g., smart contracts, and transactions (e.g., IP transaction, DNS records, etc.).

Figure 9:
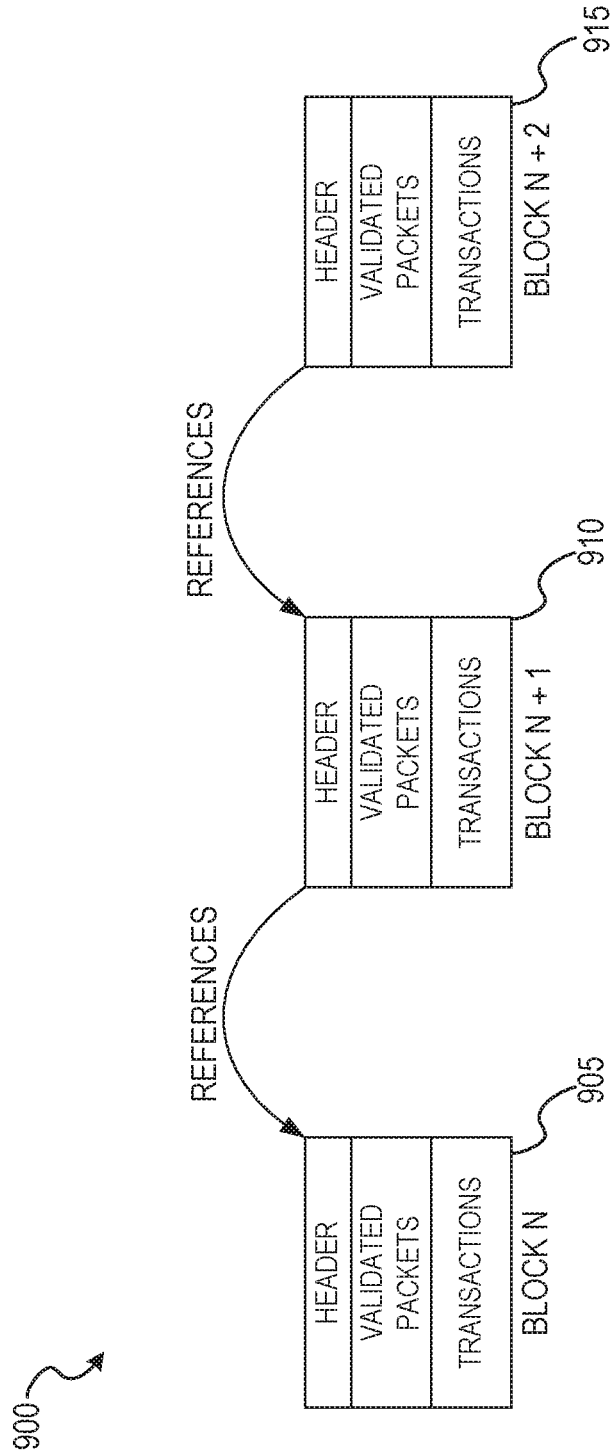
FIG. 9 shows an example data structure of a router based blockchain, according to some example embodiments.

FIG. 9 shows an example data structure of a router based blockchain, according to some example embodiments. As illustrated, each of the blocks may include header data, a collection of root packets, and transactions. Further, each block added to the blockchain 900 references the previous block, thus linking the blocks together. In some example embodiments each block is generated by a hashing data together including an identifier from the previous block. For example, block 915 may be generated by hashing the following data: header data which includes the ID of the previous block 910, root packets that met the block criteria used to generate the block 915, and one or more transactions to be recorded in the blockchain (e.g., smart contracts, resource agreements). Likewise, block 910 is computed using a referenced ID from the previous block 905.

Figure 10:
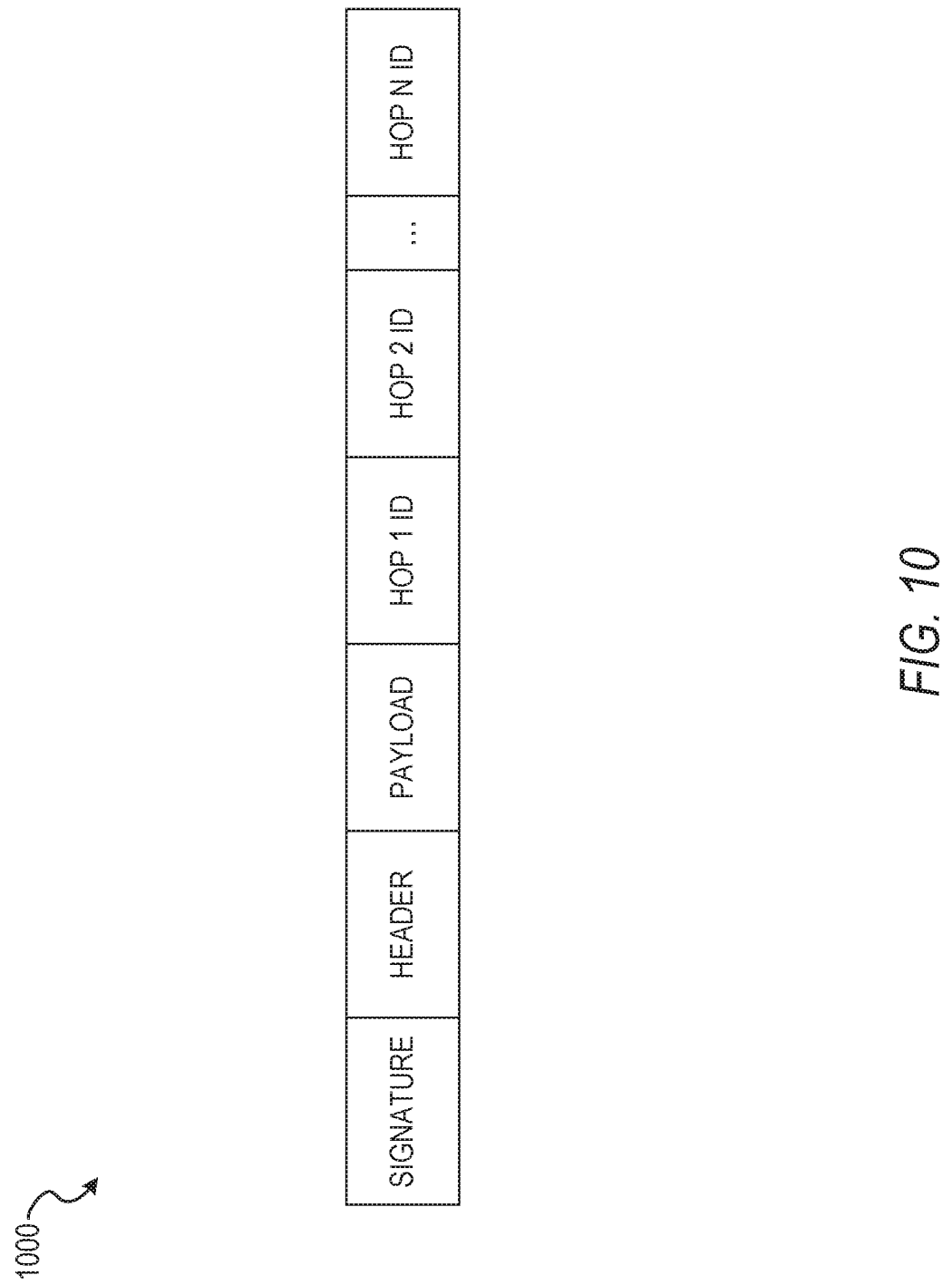
FIG. 10 shows an example packet structure, according to some example embodiments.
Figure 11:
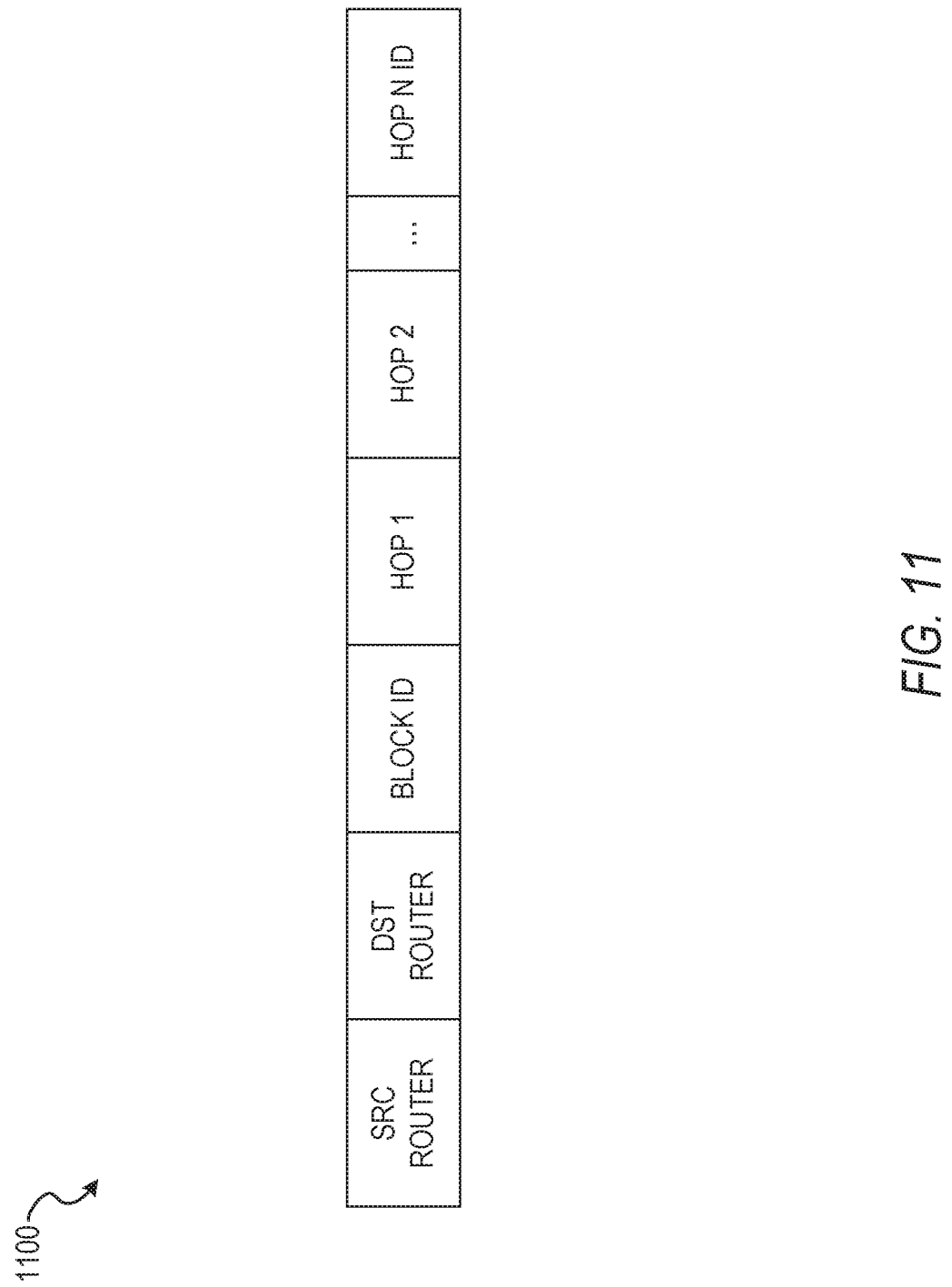
FIG. 11 shows an example packet structure, according to some example embodiments.
Figure 12:
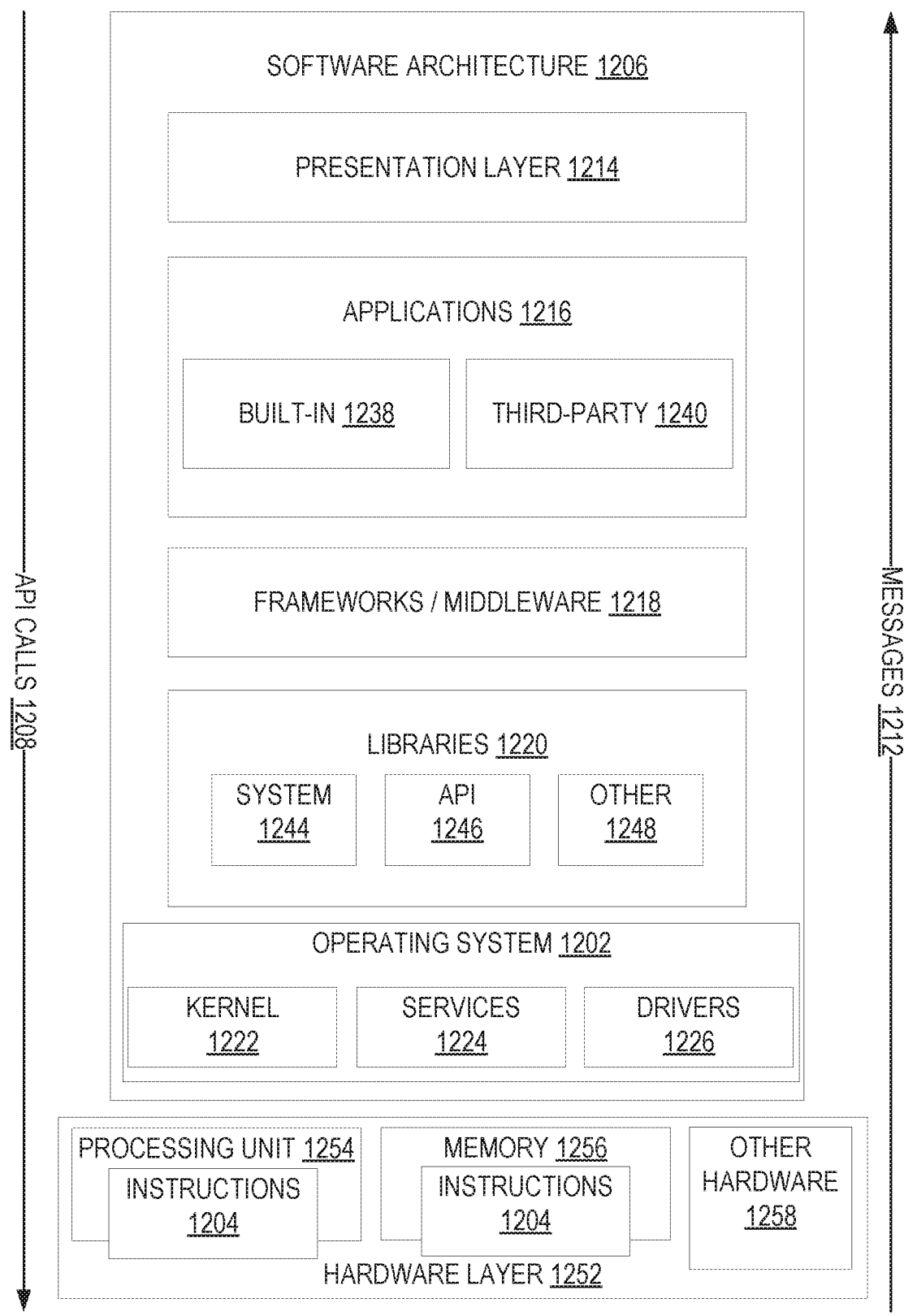
FIG. 12 is a block diagram illustrating a representative software architecture, which may be used in conjunction with various hardware architectures herein described.

FIGS. 10 and 11 show an example packet structure 1000 and 1100, according to some example embodiments. Each packet routed within the network contains routing metadata, such as the source and destination routers, the intermediate hops within the network, and an aggregated signature. When sending a packet, the source router determines a routable path from itself to the destination router and can predetermine the best routing path based on inspection of recorded root packets (e.g., root packets recorded in blocks) or based on replaying the full set of peering records that are stored on the blockchain. In some example embodiments, block criteria can further specify that each router along the path successfully be signed before that packet can be included in a root packet to satisfy block criteria. FIG. 12 is a block diagram illustrating an example software architecture 1206, which may be used in conjunction with various hardware architectures herein described.

FIG. 12 is a non-limiting example of a software architecture, and it will be appreciated that many other architectures may be implemented to facilitate the functionality described herein. The software architecture 1206 may execute on hardware such as a machine 1300 of FIG. 13 that includes, among other things, processors, memory, and I/O components. A representative hardware layer 1252 is illustrated and can represent, for example, the machine 1300 of FIG. 13. The representative hardware layer 1252 includes a processing unit 1254 having associated executable instructions 1204. The executable instructions 1204 represent the executable instructions of the software architecture 1206, including implementation of the methods, components, and so forth described herein. The hardware layer 1252 also includes a memory/storage 1256, which also has the executable instructions 1204. The hardware layer 1252 may also comprise other hardware 1258.

In the example architecture of FIG. 12, the software architecture 1206 may be conceptualized as a stack of layers where each layer provides a particular functionality. For example, the software architecture 1206 may include layers such as an operating system 1202, libraries 1220, frameworks/middleware 1218, applications 1216, and a presentation layer 1214. Operationally, the applications 1216 and/or other components within the layers may invoke application programming interface (API) calls 1208 through the software stack and receive a response in the form of messages 1212. The layers illustrated are representative in nature and not all software architectures have all layers. For example, some mobile or special-purpose operating systems may not provide a frameworks/middleware 1218, while others may provide such a layer. Other software architectures may include additional or different layers.

The operating system 1202 may manage hardware resources and provide common services. The operating system 1202 may include, for example, a kernel 1222, services 1224, and drivers 1226. The kernel 1222 may act as an abstraction layer between the hardware and the other software layers. For example, the kernel 1222 may be responsible for memory management, processor management (e.g., scheduling), component management, networking, security settings, and so on. The services 1224 may provide other common services for the other software layers. The drivers 1226 are responsible for controlling or interfacing with the underlying hardware. For instance, the drivers 1226 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1220 provide a common infrastructure that is used by the applications 1216 and/or other components and/or layers. The libraries 1220 provide functionality that allows other software components to perform tasks in an easier fashion than by interfacing directly with the underlying operating system 1202 functionality (e.g., kernel 1222, services 1224, and/or drivers 1226). The libraries 1220 may include system libraries 1244 (e.g., C standard library) that may provide functions such as memory allocation functions, string manipulation functions, mathematical functions, and the like. In addition, the libraries 1220 may include API libraries 1246 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1220 may also include a wide variety of other libraries 1248 to provide many other APIs to the applications 1216 and other software components/modules.

The frameworks/middleware 1218 provide a higher-level common infrastructure that may be used by the applications 1216 and/or other software components/modules. For example, the frameworks/middleware 1218 may provide various graphic user interface (GUI) functions, high-level resource management, high-level location services, and so forth. The frameworks/middleware 1218 may provide a broad spectrum of other APIs that may be utilized by the applications 1216 and/or other software components/modules, some of which may be specific to a particular operating system 1202 or platform.

The applications 1216 include built-in applications 1238 and/or third-party applications 1240. Examples of representative built-in applications 1238 may include, but are not limited to, a contacts application, a browser application, a book reader application, a location application, a media application, a messaging application, and/or a game application. The third-party applications 1240 may include an application developed using the ANDROID™ or IOS™ software development kit (SDK) by an entity other than the vendor of the platform and may be mobile software running on a mobile operating system such as IOS™, ANDROID™, WINDOWS® Phone, or other mobile operating systems. The third-party applications 1240 may invoke the API calls 1208 provided by the mobile operating system (such as the operating system 1202) to facilitate functionality described herein.

The applications 1216 may use built-in operating system functions (e.g., kernel 1222, services 1224, and/or drivers 1226), libraries 1220, and frameworks/middleware 1218 to create user interfaces to interact with users 106 of the system. Alternatively, or additionally, in some systems, interactions with a user 106 may occur through a presentation layer, such as the presentation layer 1214. In these systems, the application/component "logic" can be separated from the aspects of the application/component that interact with a user 106.

Figure 13:
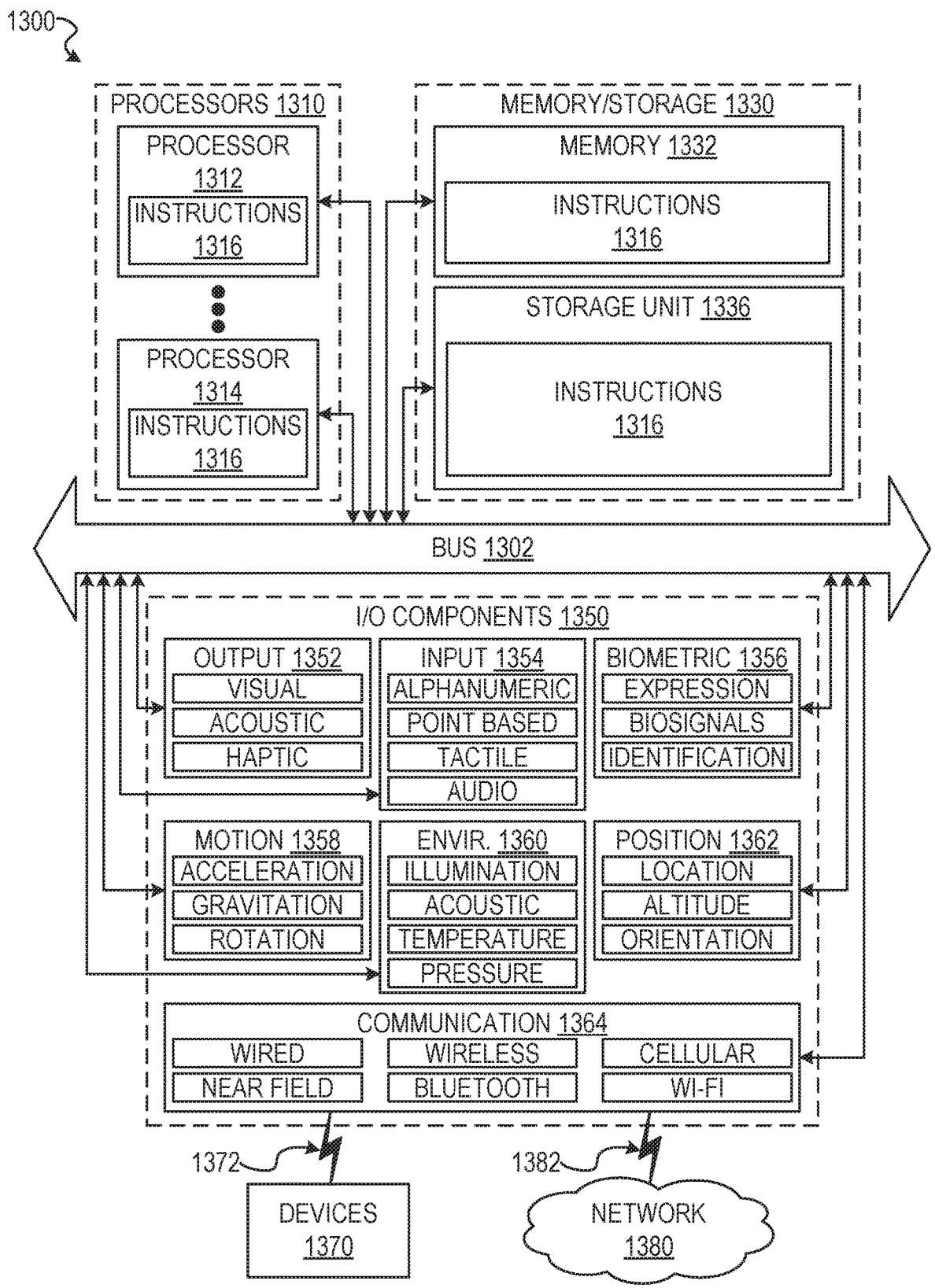
FIG. 13 is a block diagram illustrating components of a machine, according to some example embodiments, able to read instructions from a machine-readable medium (e.g., a machine-readable storage medium) and perform any one or more of the methodologies discussed herein.

FIG. 13 is a block diagram illustrating components of a machine 1300, according to some example embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application, an applet, an app, or other executable code) for causing the machine 1300 to perform any one or more of the methodologies discussed herein may be executed. As such, the instructions 1316 may be used to implement modules or components described herein. The instructions 1316 transform the general, non-programmed machine 1300 into a particular machine 1300 programmed to carry out the described and illustrated functions in the manner described. In alternative embodiments, the machine 1300 operates as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines that individually or jointly execute the instructions 1316 to perform any one or more of the methodologies discussed herein.

The machine 1300 may include processors 1310, memory/storage 1330, and I/O components 1350, which may be configured to communicate with each other such as via a bus 1302. The memory/storage 1330 may include a memory 1332, such as a main memory, or other memory storage, and a storage unit 1336, both accessible to the processors 1310 such as via the bus 1302. The storage unit 1336 and memory 1332 store the instructions 1316 embodying any one or more of the methodologies or functions described herein. The instructions 1316 may also reside, completely or partially, within the memory 1332, within the storage unit 1336, within at least one of the processors 1310 (e.g., within the processor's cache memory), or any suitable combination thereof, during execution thereof by the machine 1300. Accordingly, the memory 1332, the storage unit 1336, and the memory of the processors 1310 are examples of machine-readable media.

The I/O components 1350 may include a wide variety of components to receive input, provide output, produce output, transmit information, exchange information, capture measurements, and so on. The specific I/O components 1350 that are included in a particular machine 1300 will depend on the type of machine. For example, portable machines such as mobile phones will likely include a touch input device or other such input mechanisms, while a headless server machine will likely not include such a touch input device. It will be appreciated that the I/O components 1350 may include many other components that are not shown in FIG. 13. The I/O components 1350 are grouped according to functionality merely for simplifying the following discussion and the grouping is in no way limiting. In various example embodiments, the I/O components 1350 may include output components 1352 and input components 1354. The output components 1352 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1354 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1350 may include biometric components 1356, motion components 1358, environment components 1360, or position components 1362 among a wide array of other components. For example, the biometric components 1356 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1358 may include acceleration sensor components (e.g., accelerometer), gravitation sensor components, rotation sensor components (e.g., gyroscope), and so forth. The environment components 1360 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1362 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1350 may include communication components 1364 operable to couple the machine 1300 to a network 1380 or devices 1370 via a coupling 1382 and a coupling 1372 respectively. For example, the communication components 1364 may include a network interface component or other suitable device to interface with the network 1380. In further examples, the communication components 1364 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1370 may be another machine or any of a wide variety of peripheral devices (e.g., a peripheral device coupled via a Universal Serial Bus (USB)).

Moreover, the communication components 1364 may detect identifiers or include components operable to detect identifiers. For example, the communication components 1364 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF413, Ultra Code, UCC RSS-2D barcode, and other optical codes), or acoustic detection components (e.g., microphones to identify tagged audio signals). In addition, a variety of information may be derived via the communication components 1364, such as location via Internet Protocol (IP) geolocation, location via Wi-Fi® signal triangulation, location via detecting an NFC beacon signal that may indicate a particular location, and so forth.

Glossary

"CARRIER SIGNAL" in this context refers to any intangible medium that is capable of storing, encoding, or carrying instructions 1316 for execution by the machine 1300, and includes digital or analog communications signals or other intangible media to facilitate communication of such instructions 1316. Instructions 1316 may be transmitted or received over the network 1380 using a transmission medium via a network interface device and using any one of a number of well-known transfer protocols.

"CLIENT DEVICE" in this context refers to any machine 1300 that interfaces to a communications network 1380 to obtain resources from one or more server systems or other client devices 110. A client device 110 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user 106 may use to access a network 1380.

"COMMUNICATIONS NETWORK" in this context refers to one or more portions of a network 1380 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1380 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"MACHINE-READABLE MEDIUM" in this context refers to a component, a device, or other tangible media able to store instructions 1316 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1316. The term "machine-readable medium" shall also be taken to include any medium, or combination of multiple media, that is capable of storing instructions 1316 (e.g., code) for execution by a machine 1300, such that the instructions 1316, when executed by one or more processors 1310 of the machine 1300, cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 1310) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1300) uniquely tailored to perform the configured functions and are no longer general-purpose processors 1310. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1310 configured by software to become a special-purpose processor, the general-purpose processor 1310 may be configured as respectively different special-purpose processors (e.g., comprising different hardware components) at different times. Software accordingly configures a particular processor or processors 1310, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1310 that are temporarily configured (e.g., by software) or permanently configured to perform the relevant operations. Whether temporarily or permanently configured, such processors 1310 may constitute processor-implemented components that operate to perform one or more operations or functions described herein. As used herein, "processor-implemented component" refers to a hardware component implemented using one or more processors 1310. Similarly, the methods described herein may be at least partially processor-implemented, with a particular processor or processors 1310 being an example of hardware. For example, at least some of the operations of a method may be performed by one or more processors 1310 or processor-implemented components. Moreover, the one or more processors 1310 may also operate to support performance of the relevant operations in a "cloud computing" environment or as a "software as a service" (SaaS). For example, at least some of the operations may be performed by a group of computers (as examples of machines 1300 including processors 1310), with these operations being accessible via a network 1380 (e.g., the Internet) and via one or more appropriate interfaces (e.g., an API). The performance of certain of the operations may be distributed among the processors 1310, not only residing within a single machine 1300, but deployed across a number of machines 1300. In some example embodiments, the processors 1310 or processor-implemented components may be located in a single geographic location (e.g., within a home environment, an office environment, or a server farm). In other example embodiments, the processors 1310 or processor-implemented components may be distributed across a number of geographic locations.

"PROCESSOR" in this context refers to any circuit or virtual circuit (a physical circuit emulated by logic executing on an actual processor 1310) that manipulates data values according to control signals (e.g., "commands", "op codes", "machine code", etc.) and which produces corresponding output signals that are applied to operate a machine 1300. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1310 may further be a multi-core processor 1310 having two or more independent processors 1310 (sometimes referred to as "cores") that may execute instructions 1316 contemporaneously.

"TIMESTAMP" in this context refers to a sequence of characters or encoded information identifying when a certain event occurred, for example giving date and time of day, sometimes accurate to a small fraction of a second.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

What is claimed is:

1. A method comprising:
   receiving, from one or more routers, a plurality of valid packets, each valid packet being valid based on having a value that satisfies a match value of an individual packet threshold, the match value being a numerical format of a signature of the valid packet;
   determining that the plurality of valid packets satisfies a packet group threshold; and
   in response to determining that the plurality of valid packets satisfies the packet group threshold, generating a block in a blockchain.

2. The method of claim 1, wherein the block is generated from the plurality of valid packets that satisfy the packet group threshold.

3. The method of claim 1, wherein the match value is a numerical limit to be met.

4. The method of claim 1, wherein the packet group threshold specifies a minimum quantity of routers traversed for each packet.

5. The method of claim 1, further comprising:
   receiving a packet; and
   determining that the packet is a valid packet based on the packet satisfying the individual packet threshold.

6. The method of claim 1, further comprising:
   accessing the blockchain to identify valid packets stored in the blockchain;
   identifying a plurality of network components that routed the plurality of valid packets;
   determining a routing distribution that describes proportions of the plurality of valid packets that the plurality of network components routed; and
   storing the routing distribution.

7. The method of claim 6, further comprising:
   transmitting one or more units of network credits to accounts of the network components in proportion to the routing distribution.

8. The method of claim 7, wherein the units of network credits are cryptocurrency units managed by the blockchain.

9. The method of claim 8, wherein instructions for routing units of network credits in proportion to the routing distribution are stored in smart contracts managed by the blockchain.

10. The method of claim 1, further comprising:
    determining a network resource distribution that describes proportions of network resource usage by one or more network entities; and
    storing the network resource distribution.

11. The method of claim 10, wherein the network resource distribution comprises domain name usage.

12. A system comprising:
    one or more processors of a machine; and a memory storing instructions that, when executed by the one or more processors, cause the machine to perform operations comprising:

receiving, from one or more routers, a plurality of valid packets, each valid packet being valid based on having a value that satisfies a match value of an individual packet threshold, the match value being a numerical format of a signature of the valid packet;

determining that the plurality of valid packets satisfies a packet group threshold; and in response to determining that the plurality of valid packets satisfies the packet group threshold, generating a block in a blockchain.

13. The system of claim 12, wherein the block is generated from the plurality of valid packets that satisfy the packet group threshold.

14. The system of claim 12, wherein the match value is a numerical limit to be met.

15. The system of claim 14, wherein the operations further comprise:

receiving a packet; and determining that the packet is a valid packet based on the packet satisfying the individual packet threshold.

16. The system of claim 15, wherein a router determines that a packet is a valid packet based on the packet satisfying the individual packet threshold.

17. The system of claim 12, wherein the packet group threshold specifies a minimum quantity of network components to be traversed for each packet.

18. A machine-readable storage device embodying instructions that, when executed by a device, cause the device to perform operations comprising:

receiving, from one or more routers, a plurality of valid packets, each valid packet being valid based on having a value that satisfies a match value of an individual packet threshold, the match value being a numerical format of a signature of the valid packet;

determining that the plurality of valid packets satisfies a packet group threshold; and in response to determining that the plurality of valid packets satisfies the packet group threshold, generating a block in a blockchain.

19. The machine-readable storage device of claim 18, wherein the block is generated from the plurality of valid packets that satisfy the packet group threshold.

20. The machine-readable storage device of claim 18, wherein the match value is a numerical limit to be met.

* * * * *